United States Patent [19]

Summan

[11] 4,000,632
[45] Jan. 4, 1977

[54] LOCKING GAS CAP

[75] Inventor: Dennis J. Summan, Connersville, Ind.

[73] Assignee: Stant Manufacturing Company, Inc., Connersville, Ind.

[22] Filed: Aug. 4, 1975

[21] Appl. No.: 601,264

[52] U.S. Cl. .................................. 70/165; 220/210
[51] Int. Cl.² ........................................ B65D 55/14
[58] Field of Search ............ 70/163, 165, 167, 168, 70/169, 171, 172, 173; 220/210, 203, 303

[56] References Cited

UNITED STATES PATENTS

| 1,702,205 | 2/1929 | Freedman | 70/165 |
| 1,770,710 | 7/1930 | Prince | 70/168 |
| 2,125,819 | 8/1938 | Schneider | 70/172 |
| 2,301,074 | 11/1942 | Nusbaum | 70/165 |
| 3,907,155 | 9/1975 | Smith et al. | 220/210 |

FOREIGN PATENTS OR APPLICATIONS

| 234,285 | 5/1925 | United Kingdom | 70/172 |

Primary Examiner—Paul R. Gilliam
Assistant Examiner—Kenneth J. Dorner
Attorney, Agent, or Firm—Jenkins, Hanley & Coffey

[57] ABSTRACT

A locking, threaded gas cap for vehicle fuel tanks having threaded filler necks, the cap comprising a closure member threaded to engage and close the filler neck and an outer shell member mounted on the closure member for relative rotation to provide a hand grip. The closure member provides a plurality of abutments spaced peripherally about its axis while the shell member provides at least one yieldably movable drive finger extending radially outwardly into engagement with the abutments. The shell member provides a first stop for preventing movement of the drive finger out of engagement with the abutments when the shell member is rotated in one direction to thread the closure member onto the filler neck. The shell member provides a second stop having an operative position for preventing movement of the drive finger out of engagement with the abutments when the shell member is rotated in the opposite direction to remove the closure member. A key-operated lock is mounted in the shell member and connected to the second stop to move the second stop into and out of its operative position.

8 Claims, 4 Drawing Figures

LOCKING GAS CAP

The present invention relates to locking gas caps, and more particularly to the provision of a locking threaded gas cap of novel construction.

It is conventional to provide gas caps with cylinder locks arranged to move locking members so that the gas cap can be removed. This is a well-known theft protection device. Usually, the cylinder lock moves a locking member radially inwardly out of engagement with a portion of the filler neck.

The prior art, such as represented by U.S. Pat. Nos. 1,529,920; 1,908,593; and 2,163,042 teach the concept of a key-operated device for drivingly connecting the outer shell of a gas cap to the closure member or inner mechanism of the cap to prevent relative rotation. In other words, it is known to have caps for closing filler necks, which caps include an inner closure member and an outer shell member which is rotatable on the inner closure member until a lock mechanism is actuated by a key to provide a driving connection between the two members. Applicant's invention comprises a new and advantageous mechanism for providing the driving connection between the outer shell member and the inner closure member which is threaded onto the filler neck.

An object of the present invention, therefore, is to provide such a cap comprising a closure member threaded to engage and close the filler neck and an outer shell member mounted on the closure member to provide a hand grip and in which the improvement comprises means for connecting the outer shell member for rotation on the closure member and means for establishing a driving connection between the members. The said driving connection means includes a plurality of peripherally spaced apart abutments rigidly attached to one of the members and at least one drive finger attached to the other of the members for movement between a first position which engages the abutments and a second position out of engagement with the abutments, means for yieldably urging the drive finger to the first position, first stop means for preventing movement of the finger away from the first position when the shell member is rotated in one direction to advance the closure member onto the filler neck, second stop means having an operative position for preventing movement of the finger away from the first position when the shell member is rotated in the opposite direction, and lock means for moving the second stop means to the said operative position to permit removal of the cap.

In such a system, when the lock means is actuated to move the stop means to its operative position, the drive finger is held against movement away from its position which engages the abutments such that movement of the outer shell member will move the closure member in the same direction. Generally, and conventionally, movement of the closure member clockwise will tighten it on the filler neck while movement of the closure member counterclockwise will remove it from the filler neck.

Other objects and features of the present invention will become apparent as this description progresses.

Figure 1:
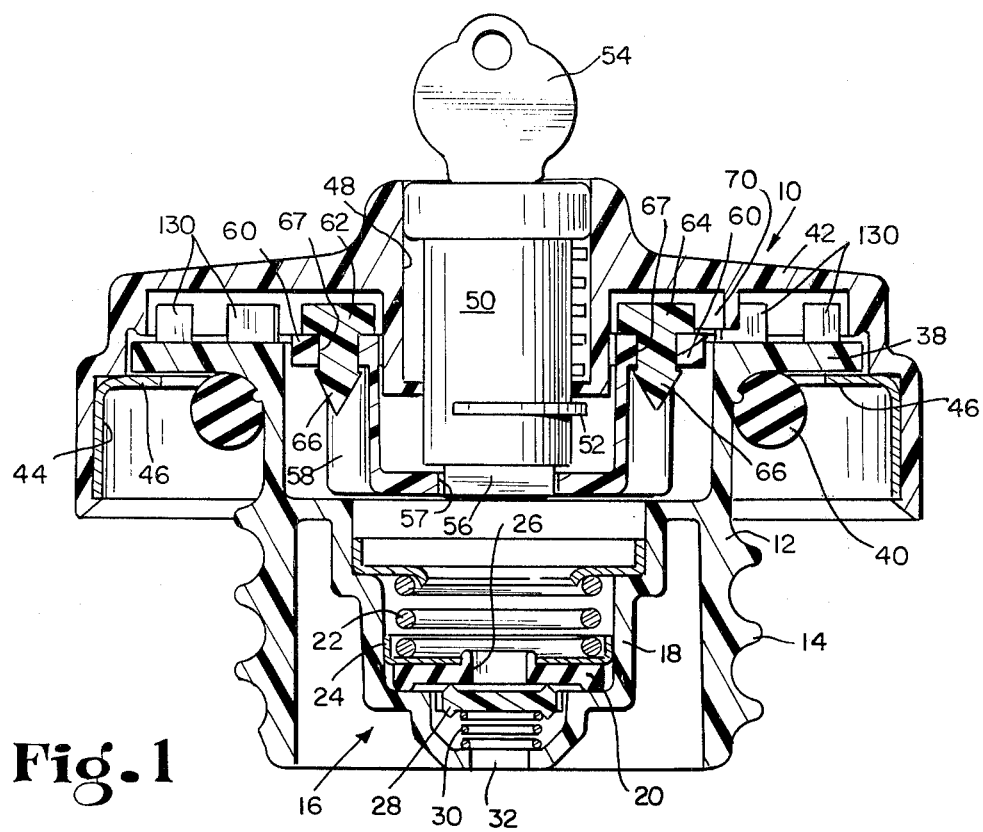
FIG. 1 is a sectional view of the cap of the present invention taken generally along the line 1—1 in FIG. 3.
Figure 2:
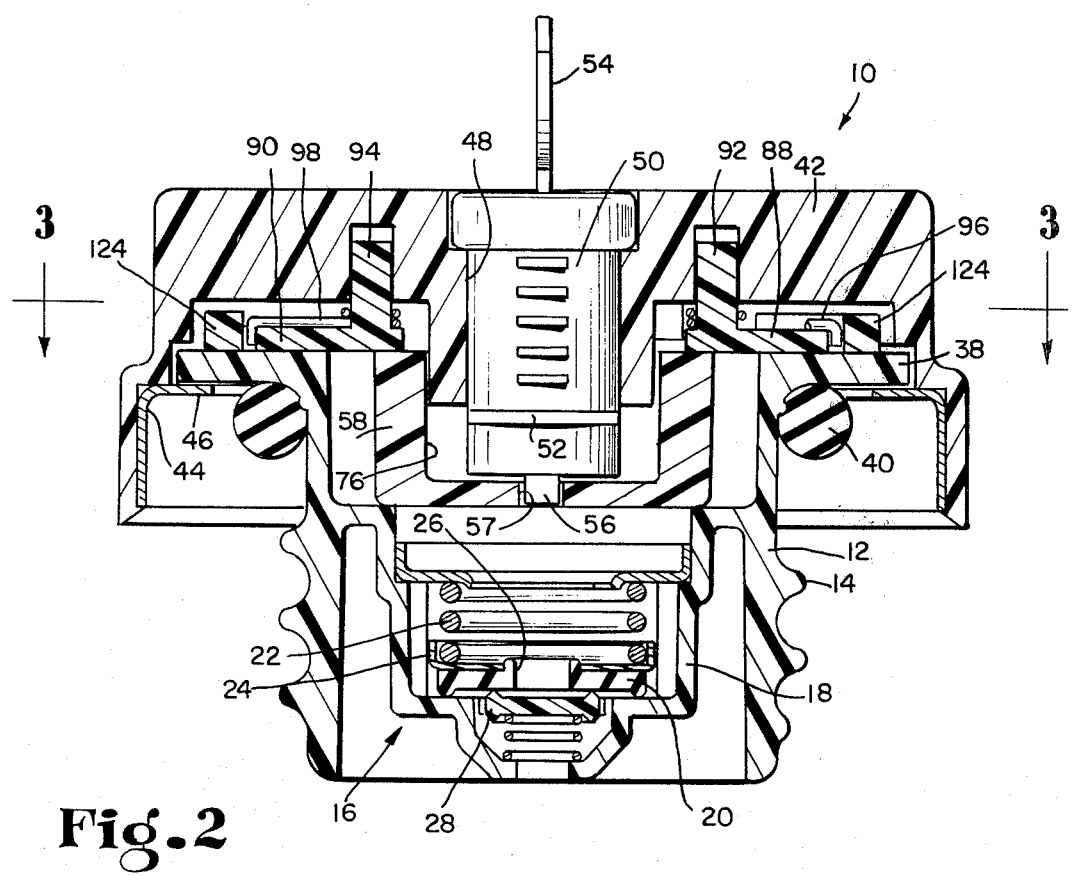
FIG. 2 is a sectional view of the cap taken generally along the line 2—2 in FIG. 3.

Referring now to the drawings, it will be seen that the cap 10 comprises a closure member 12 which is cylindrical and which is provided with external threads 14 for threadedly engaging mating internal threads on the filler neck (not shown). It will be appreciated, however, that internal threads may be on the cap to engage external threads on a filler neck if that is desired. The cap 10 includes a pressure-vacuum valve assembly 16 disposed in the integrally formed valve housing portion 18 and conventionally comprising a pressure valve gasket 20 urged to its closing position by a spring 22 and spring plate 24. This gasket 20 has a central port 26 therethrough which is closed by a vacuum valve member 28 urged to its closing position by a spring 30. The axially inner end of the housing portion 18 is provided with a vent port 32 through which the fuel tank is vented as controlled by the assembly 16. The threaded cap of the present invention, however, is not limited to caps having pressure-vacuum valve assemblies and may be used on any threaded cap.

The closure member 12 is formed to provide, at its axially outer end, a radially outwardly extending flange 38, and it carries, below that flange, an O-ring 40 for sealingly engaging the filler neck. The cap 10 comprises an outer shell member 42 which is mounted on and which covers the axially outer end portion flange 38 of the closure member 12 as illustrated. This shell member 42 is connected to the closure member 12 by means such as the illustrated concentric annular locking ring 44 having an upper, peripherally and radially inwardly extending flange 46 engaging the bottom surface of the flange 38. Thus, the outer shell member 42 is rotatable upon the closure member 12 about the axis of the closure member. It is this shell member which provides the gripping surface or the surface which is gripped and rotated to remove the cap 10.

The outer shell member 42 provides a coaxially extending cavity 48 into which a cylinder lock 50 is disposed and secured by means of a locking tab 52. A key 54 is inserted into the lock 50 and used to drive a lock tang 56 about the axis of the lock, this tang 56 extending into a slot 57 of a cup-shaped connecting member 58 having, at its axially upper portion a radially outwardly extending flange 60.

A pair of cams 62,64, hereinbefore referred to as first stop means, are connected to the flange 60 at diametrically opposite points for pivotal movement about axes parallel to the axis of the cylinder lock. Illustratively, these cams 62,64 are provided with posts 66 which snap through openings 67 in the flange 60 to provide the pivotal connections.

The shell member 42 provides axially inwardly and peripherally extending ridges formed to define guide surfaces 68,70, respectively, for the cams 62,64, the guide surfaces being concentric with the axis of the cylinder lock. Looking at FIGS. 3 and 4, it will be seen that these guide surfaces 68,70 terminate at their ends with rigid stops 72,74 which extend outwardly generally tangential to a concentric circle approximately equal in size, for instance, to the internal diameter indicated at 76 of the connecting member 58.

The shell member also provides axially inwardly extending rigid stops 80,82 which extend, generally parallel, to the aforementioned stop surfaces 72,74. Then, illustratively, two drive fingers 88,90 are mounted upon the shell member 42 for pivotal movement about diametrically opposed axes parallel to the cylinder lock 50 axis as defined by posts 92,94 extending upwardly into the shell member. Springs 96,98 yieldably urge these drive fingers 88,90 against the stops 80,82. The illustrative springs 96,98 have their center portions coiled about the posts 92,94. One end of each spring is connected to its drive finger while the opposite end of each spring 96,98 is retained by a spring post 100, 102.

Figure 3:
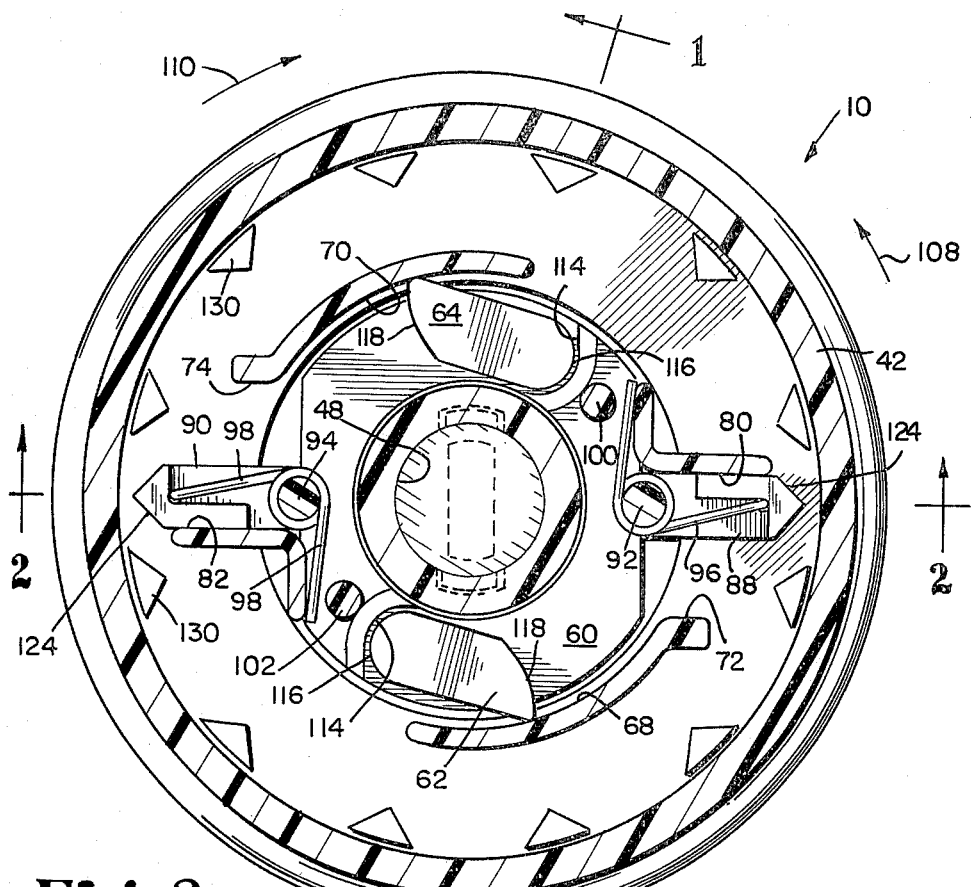
FIG. 3 is a sectional view taken generally along the line 3—3 in FIG. 2.
Figure 4:
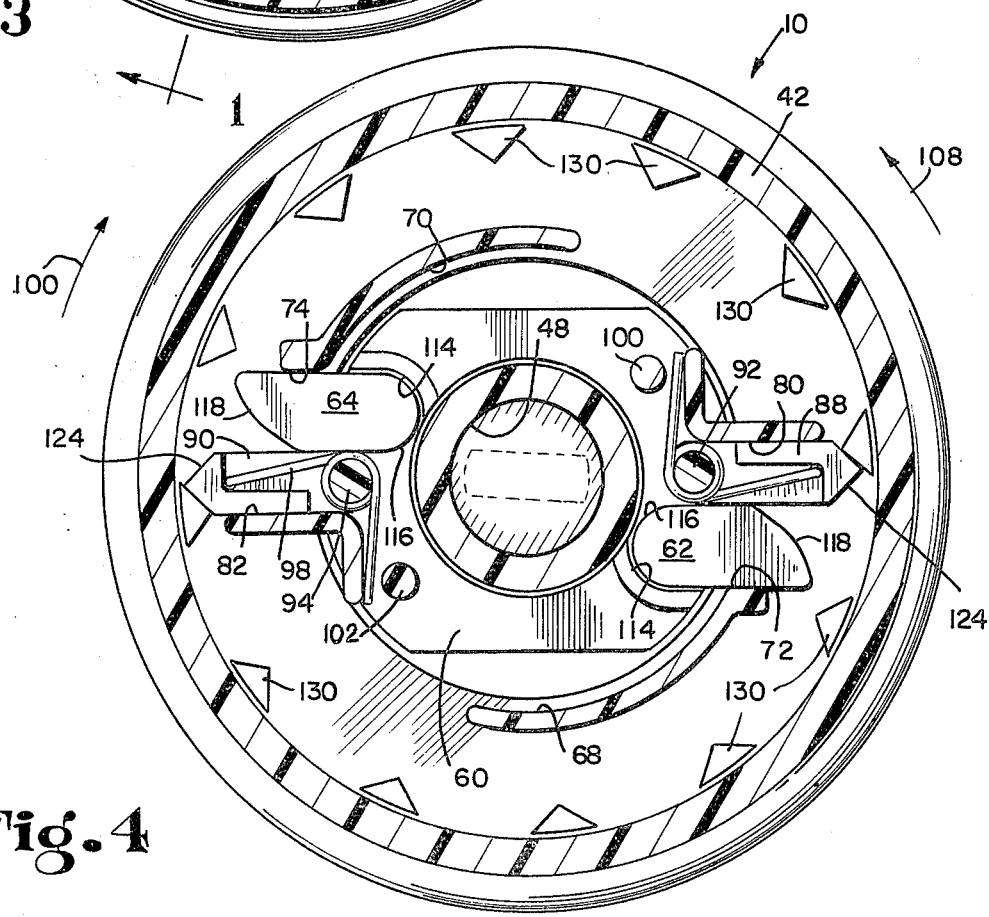
FIG. 4 is a sectional view similar to the view of FIG. 3 only showing the locking cams in their operative locking position.

In FIGS. 3 and 4, the arrow 108 is in the counterclockwise direction to represent the rotational direction which loosens the closure member 12 while the arrow 110 is in the clockwise direction to represent the direction which tightens the closure member 12. The outer shell 42 is, therefore, rotated in the direction of the arrow 110 to place the cap 10 on the filler neck and in the direction of the arrow 108 to remove the cap from the filler neck. This relationship is important to the operational discussion hereinafter.

The flange 60 is formed to provide axially upwardly extending flanges 114 curved concentrically about the pivot axes, respectively, of the cams 62,64 to receive the conformingly shaped ends 116 of the cams. The distal ends 118 of the cams 62,64 are formed as cam surfaces to move the cams clockwise about their respective pivot axes as the cams are moved counterclockwise along their guide surfaces 68,70 toward their stops 72,74. FIG. 3 shows the cams 62,64 in their inoperative positions. FIG. 4 shows the cams 62,64 in their operative positions against the stops 72,74. It will be appreciated that the cams 62,64, in their operative positions of FIG. 4, will prevent movement of the drive fingers 88,90, respectively, about their pivot axes. In other words, when the outer shell 42 is rotated in the counterclockwise direction of the arrow 108, the drive fingers 88,90 will be prevented by the cams from rotating clockwise (FIG. 4) about their pivot axes. Of course, as viewed in FIGS. 3 and 4, the drive fingers 88,90 cannot pivot counterclockwise about their pivot axes because of the stops 80,82.

The drive fingers 88,90 extend radially outwardly to have their distal ends 124 extend into engagement with a plurality of peripherally spaced apart abutments 130 extending rigidly axially upwardly from the flange 38. It is the engagement of the distal ends 124 of the drive fingers 88,90 with these abutments 130 which provides the driving connection between the shell member 42 and the closure member 12. When the cams 62,64 are in their inoperative position as shown in FIG. 3, rotation of the shell member 42 in the direction of the arrow 108 will not drive the closure member in that direction because the drive fingers will simply yield against their springs 96, 98. When a key is inserted into the cylinder lock and the connecting member 58 is rotated counterclockwise as viewed in FIG. 3, the cams 62,64 are moved into their operative position to stop movement of the drive fingers 88,90. Thus, when the cams are in their FIG. 4 position, the closure member 12 is drivingly connected to the shell member 42.

The stops 80,82 constitute first means for stopping movement of the drive fingers 88,90 out of engagement with the abutments 130 while the cams 62, 64 constitute second means for stopping movement of the drive fingers out of engagement with the abutments 130, the second stopping means being moved in and out of operative engagement with the drive fingers by the cylinder lock 50.

I claim:

1. A threaded cap for a threaded filler neck, said cap comprising a closure member threaded to engage and close said filler neck and an outer shell member mounted on said closure member to provide a hand grip, in which the improvement comprises means for connecting said outer shell member for rotation on said closure member, and means for establishing a driving connection between said members, said driving connection means including a plurality of peripherally spaced apart abutments rigidly attached to one of said members and at least one drive finger attached to the other of said members for movement between a first position which engages said abutments and a second position out of engagement with said abutments, means for yieldably urging said drive finger to said first position, a first rigid stop for preventing movement of said finger away from said first position when said shell member is rotated in one direction to advance said closure member onto the filler neck, said rigid stop being stationary with respect to said shell member, second stop means including a stop cam movable into an operative position for preventing movement of said finger away from said first position when said shell member is rotated in the opposite direction, and lock means for moving said second stop means to said operative position to permit removal of said cap, said lock means being operatively connected to said second stop means.

2. The improvement of claim 1 in which said abutments extend outwardly from said closure member and said drive finger is attached to said shell member, said lock means including a key-operated cylinder lock and means for drivingly connecting said cylinder lock to said second stop means so that rotation of said cylinder lock moves said second stop means.

3. The improvement of claim 2 in which said shell member provides a rigid stop adjacent said operative position and against which said cam is disposed in said operative position, said rigid stop being effective to hold said cam against movement out of said operative position by said drive finger.

4. The improvement of claim 3 in which said means for drivingly connecting said cylinder lock to said second stop means includes a connecting member which rotates with said cylinder lock, said cam being connected to said connecting member for pivotal movement about an axis parallel to the rotational axis of said cylinder lock, and said shell member providing a rigid guide for said cam as it is moved by said lock.

5. A closure cap for a fuel tank filler neck defining an axis and being threaded about said axis, said cap comprising a closure member for threadedly engaging and closing said filler neck and an outer shell member providing a gripping surface for said cap, in which the improvement comprises means for mounting said shell member on said closure member for rotation relative thereto about said axis, one of said members providing a plurality of peripherally spaced rigid abutments, the other of said members providing at least one movable drive finger for engaging said abutments, first means for stopping movement of said finger out of engagement with said abutments when said shell member is rotated in one direction to advance the threaded engagement of said closure member with said filler neck, second means for stopping movement of said finger out of engagement with said abutments when said shell member is rotated in the opposite direction threadedly to disengage said closure member from the filler neck, and cylinder lock means for moving said second stopping means into and out of operative engagement with said finger, said lock means being operatively connected to said second stop means, said first stopping means including a first rigid stop provided by, and stationary with respect to, said other member, said second stopping means including a locking cam mounted for movement on said other member by said lock means, and said other member providing a second rigid stop adjacent the drive finger and against which said cam is disposed when in said operative engagement with said finger.

6. The improvement of claim 5 in which said other member provides a guide for controlling movement of said cam by said lock.

7. A locking threaded gas cap for vehicle fuel tanks having a threaded filler neck, said cap comprising a closure member threaded to engage and close said filler neck, and an outer shell member mounted on said closure member to provide a hand grip, in which the improvement comprises means for connecting the outer shell member to said closure member for rotation relative thereto about the threaded axis of said closure member, said closure member providing a plurality of abutments spaced peripherally about said axis, said shell member providing at least one yieldably movable drive finger extending into engagement with said abutments, said shell member also providing a first rigid stop, stationary with respect to said shell, for preventing movement of said drive finger out of engagement with said abutments when said shell member is rotated in one direction to thread said closure member onto said filler neck, second stop means including a stop cam movable to an operative position for preventing movement of said drive finger out of engagement with said abutments when said shell member is rotated in the opposite direction to remove said closure member, a key-operated lock mounted in said shell member, and means for connecting said movable stop cam to said lock for movement by said lock into said operative position.

8. The improvement of claim 7 in which there are a pair of such drive fingers diametrically opposed, said lock being a cylinder lock mounted coaxially on said shell member, said means for connecting said second stop means to said lock including a connecting member rotatable about said axis by said lock, said second stop means including a pair of cams connected to said connecting member for pivotal movement about diametrically opposed axes parallel to said thread axis, said shell member providing guides for said cams as they are moved by said lock, said guides terminating in rigid stops effective to hold said cams in said operative position, said first stop means including a pair of rigid stops provided by said shell member.

* * * * *